Nov. 15, 1932.  C. A. KUNKLER  1,888,134
CAMERA LOCK AND NUMBER INDICATING DEVICE
Filed April 2, 1931

Clarence A. Kunkler
INVENTOR

BY A. L. Evans,
ATTORNEY

Patented Nov. 15, 1932

1,888,134

UNITED STATES PATENT OFFICE

CLARENCE A. KUNKLER, OF MOUNT CLEMENS, MICHIGAN

CAMERA LOCK AND NUMBER INDICATING DEVICE

Application filed April 2, 1931. Serial No. 527,271.

My present invention has reference to cameras, and my object is the provision of a camera with means for latching the operating lever when swung to the limit of its two positions to prevent the accidental movement of the shutter and to record the number of times the shutter has been thrown so that the operator can have visible knowledge of the number of films exposed and consequently the number of films remaining on the roll.

A further object is to provide a means for this purpose that is simple in construction, cheap in manufacture and efficient in practical use.

To the attainment of the foregoing the invention consists in the improvement hereinafter described and definitely claimed.

Figure 1:
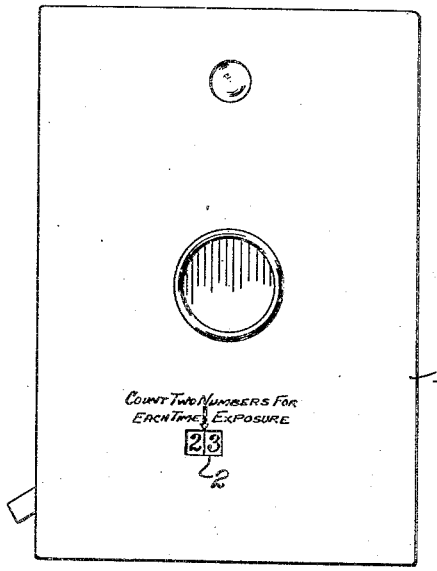
Figure 1 is a front elevation of a camera equipped with the improvement.

My improvement is especially adaptable to a small type of cameras which are cheaply constructed and which are well known in the trade but is also adapted to other types of cameras that have their shutters operated by a lever which is hand actuated.

In carrying out my invention I provide the front of the camera 1 with a window 2, and the celluloid or glass panel of the window may be translucent.

The camera is provided with the usual pivotally supported shutter 3 which may be provided with the usual spring to hold the shutter in its two thrown positions. The shutter is thrown by an angle lever, one of whose arms 4 is pivoted to the shutter and in the present instance the second arm of the lever is offset from the center thereof and formed with a straight extension 5. To this extension there is preferably removably but rigidly secured a flat spring member 6 that is bent upon itself to provide the same with an outer U-shaped portion, or more practically speaking, with a spring arm 7. The spring arm is designed to force the spring arm or lever 6 against the outer side wall of the vertically arranged slot 8 in the side of the camera and itself into contact with the second or inner side wall of the said slot, and likewise into notches 9 and 10 which communicate with the slot at the ends thereof. The spring member or lever 6 and its finger 7 therefore latch the shutter operating lever in two positions and consequently effectively hold the shutter when thrown to either of its two positions. This simple means will prevent the accidental operation of the shutter.

The pivot pin for the operating lever is in the nature of a headed element that is indicated by the numeral 10'. The pivot pin passes through inner and outer discs 11 and 12, respectively, the inner disc 11 being larger than the outer disc 12 and both of these discs are provided with peripheral spaced notches or teeth 13 and 14, respectively, the angle walls between the notches being oppositely arranged. The dials or discs 11 and 12 between the peripheral teeth 13 and 14 thereof have inscribed thereon numerals. The numerals 15 on the dial 11 are uneven and the numbers 16 on the dial 12 are even numbers, the numbers ranging from 1 to the largest number of films on the roll therefor in the camera. The pin 10' passes through a bearing sleeve 16' between the central portion of the operating lever and the central openings in the discs 11 and 12 and the bearing sleeve between the inner disc 11 and the bearing member has arranged thereon a spacer sleeve 17.

The spring arm 6 has an offset or angle portion 18 slitted from its outer end to provide the same with two spaced dogs or fingers 19 and 20, respectively, the spring finger 19 being of a less length than that of the finger 20 and these fingers engage the periphery of the dial wheels or discs 11 and 12 and the teeth thereon, with the result that when the operating lever is swung in one direction one of the dial wheels or discs will be turned therewith and when the lever is swung in a second direction the second dial wheel or disc will be turned by the lever on its pivot 10'.

Figure 3:
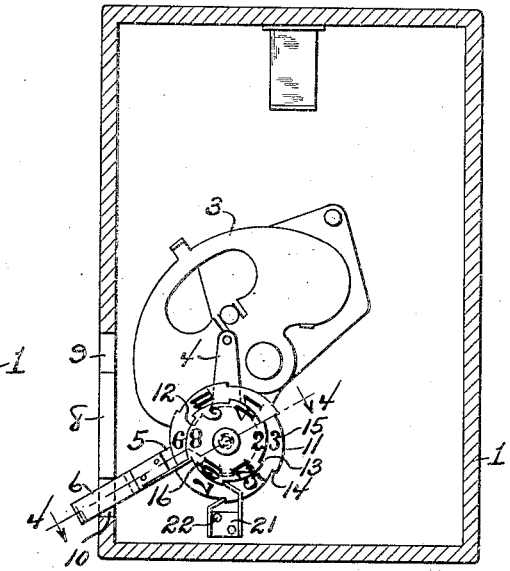
Figure 3 is a sectional view approximately on the line 3—3 of Figure 2.
Figure 2:
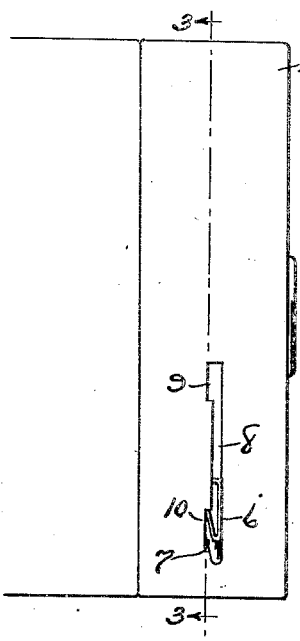
Figure 2 is a side elevation thereof.
Figure 5:
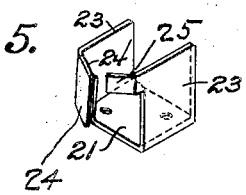
Figure 5 is a perspective view of the spring metal member provided with the fingers or dogs.
Figure 4:
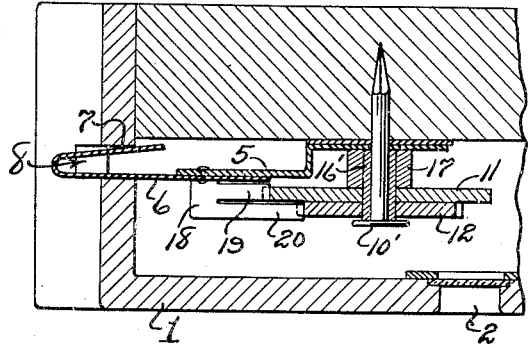
Figure 4 is a sectional view approximately on the line 4—4 of Figure 3.

To prevent the accidental turning of one of the dial wheels or discs by the swinging of the lever, and to likewise hold both of the discs so that the numerals thereon will be visible through the window 2 I provide a stop means that is best illustrated by Figures 3 and 5 of the drawing. This means comprises a spring plate bent to provide a substantially U-shaped body portion 21, the inner element of the body having openings therethrough for the reception of tacks or like elements 22 for holding the member 21 fixed in the camera. The sides 23 of the member 21 are formed at one of their outer corners with reduced extensions in the nature of spring fingers 24 and 25, respectively. The fingers are angularly arranged and are directed toward each other, the spring finger 24 being of a greater length than the spring finger 25 so that the finger 24 will engage with the teeth of the outer disc 12 and the shorter spring finger 25 will engage with the teeth of the inner disc 11. The spring fingers or dogs thus hold the discs from turning and retain the discs in proper position after the same have been turned by the operation of the lever so that the figures or numerals thereon are clearly visible through the window 2. The figure on the right hand side of the window, as disclosed by Figure 1 of the drawing, indicates the number of the film on the roll last exposed. When the lever is turned to swing the shutter to another position the numeral 4, on the small disc will appear through the window, the numeral 3 remaining stationary or in exposed position through the window, and showing that the third film has been exposed and that the fourth film is in a position for exposure. Thus the largest numbers on the disc disclosed through the windows inform the operator of the number of films exposed and as he is acquainted with the number of films on the roll he will be informed the number of films yet to be exposed.

The contact of the throw lever with the end walls of the slot will limit the movement of the shutter in both directions.

The device is of a simple construction and the advantages thereof will, it is thought, be apparent so that further detailed description will not be required.

On the front of the camera, above the window 2 there is preferably inscribed the information "count two numbers for each time exposure", or if desired, this information may be contained in a printed pamphlet of instructions to accompany the cameras when the same are placed on the market.

Having described the invention, I claim:

1. A camera having a window on its front, a vertical slot on one of its sides and having notches that communicate with the ends of the slot, a shutter operating member pivotally secured in the camera and having a spring arm extending through the slot and the said arm being bent upon itself to provide the same with a spring finger which is also received through the slot and which forces the arm against one wall of the slot and permits of the finger being received in the notches when the lever has been swung to throw the shutter to either of its two positions, number bearing wheels journaled on the pivot and the numbers of the said wheels being visible through the window, said discs having peripheral teeth, and the angle walls between the teeth on the respective discs being oppositely directed, said lever having an offset portion provided with spaced spring fingers to engage with the periphery and with the notches of the discs, and spring dogs also engaging with the periphery and the notches of the discs for holding the discs from accidental turning.

2. A camera having a window on its front, a vertical slot on one of its sides and having notches that communicate with the ends of the slot, a shutter operating member pivotally secured in the camera and having a spring arm extending through the slot and the said arm being bent upon itself to provide the same with a spring finger which is also received through the slot and which forces the arm against one wall of the slot and permits of the finger being received in the notches when the lever has been swung to throw the shutter to either of its two positions, number bearing wheels journaled on the pivot and the numbers of the said wheels being visible through the window, said discs having peripheral teeth, and the angle walls between the teeth of the respective discs being oppositely directed, said lever having an offset portion provided with spaced spring fingers to engage with the periphery and with the notches of the discs, and spring dogs also engaging with the periphery and notches of the discs for holding the discs from accidental turning, said spring dogs being formed on one of the outer corners of the sides of the substantially U-shaped member which is fixed in the camera.

3. A camera having a window and a slot, a shutter operating lever movable through the slot and limiting the throw of the shutter when moved into contact with the end walls of the slot, and exerting a frictional engagement with the walls of the slot when moved in such position for latching the lever, peripherally notched dials having numerals thereon to indicate the number of films on a spool and the films exposed as well as the number of films to be exposed and the said numbers being visible through the window in the camera, means actuated by the swinging of the lever for moving the respective discs in opposite directions in accordance with the throw of the lever, and spring means engaging the discs for holding the same from turning except when influenced by the lever.

In testimony whereof I affix my signature.

CLARENCE A. KUNKLER.